(12) United States Patent
Lenz (10) Patent No.: US 8,291,764 B2
(45) Date of Patent: Oct. 23, 2012

(54) METHOD AND APPARATUS FOR IN SITU UNBALANCE AND CORRECTIVE BALANCE DETERMINATION FOR A NON-VERTICAL AXIS ROTATING ASSEMBLY

(76) Inventor: Michael A. W. Lenz, Mukwonago, WI (US)

( * ) Notice: Subject to any disclaimer, the term of this patent is extended or adjusted under 35 U.S.C. 154(b) by 691 days.

(21) Appl. No.: 12/583,094

(22) Filed: Aug. 14, 2009

(65) Prior Publication Data

US 2011/0036166 A1 Feb. 17, 2011

(51) Int. Cl.
*G01M 1/00* (2006.01)
(52) U.S. Cl. .......................................... 73/455; 700/279
(58) Field of Classification Search ............ 73/460, 73/455, 66, 458, 462, 480; 700/279
See application file for complete search history.

(56) References Cited

U.S. PATENT DOCUMENTS

| | | | |
|---|---|---|---|
| 3,724,279 A * | 4/1973 | Woolley ........................... 73/462 |
| 3,830,109 A * | 8/1974 | Litvinovich et al. ............ 73/455 |
| 3,939,715 A | 2/1976 | Davis |
| 4,015,480 A | 4/1977 | Giers |
| 4,109,312 A | 8/1978 | Beutel |
| 4,510,809 A | 4/1985 | Fillion |
| 4,608,650 A | 8/1986 | Kapadia |
| 4,879,792 A | 11/1989 | O'Connor |
| 4,958,290 A | 9/1990 | Kendall et al. |
| 5,089,969 A | 2/1992 | Bradshaw et al. |
| 5,140,856 A * | 8/1992 | Larsen ............................ 73/455 |
| 5,219,454 A * | 6/1993 | Class ............................. 416/145 |
| 5,813,253 A * | 9/1998 | Uhlin .............................. 68/23.2 |
| 5,824,898 A * | 10/1998 | Brooks et al. ................... 73/469 |
| 6,129,768 A * | 10/2000 | Johnson et al. ................... 8/159 |
| 6,799,460 B1 * | 10/2004 | Parker et al. .................... 73/462 |
| 6,854,329 B2 * | 2/2005 | Colarelli et al. ................ 73/462 |
| 6,923,058 B2 * | 8/2005 | Nieman et al. .................. 73/462 |
| 7,219,036 B2 * | 5/2007 | Abbotoy et al. ............... 702/183 |
| 7,654,138 B2 * | 2/2010 | Thelen ............................ 73/471 |
| 7,717,013 B2 * | 5/2010 | Hildebrand et al. ......... 74/574.2 |
| 7,806,820 B2 * | 10/2010 | Howell ........................... 494/82 |
| 7,864,011 B2 * | 1/2011 | Fullerton et al. .............. 335/306 |
| 8,066,486 B2 * | 11/2011 | Christinsen et al. .......... 416/145 |
| 2003/0024308 A1 * | 2/2003 | Colarelli et al. ............... 73/460 |
| 2005/0143940 A1 * | 6/2005 | Zeh et al. ........................ 702/60 |
| 2006/0005623 A1 * | 1/2006 | Hildebrand et al. ........... 73/468 |
| 2008/0271786 A1 * | 11/2008 | Howell ............................ 137/13 |
| 2008/0282782 A1 * | 11/2008 | Mitsubori et al. ................ 73/66 |
| 2010/0000320 A1 * | 1/2010 | Shao et al. ...................... 73/487 |

* cited by examiner

*Primary Examiner* — Peter Macchiarolo
*Assistant Examiner* — Samir M Shah (57) ABSTRACT

The invention discloses a novel method and apparatus to determine the degree of residual mass unbalance and a corrective balance solution for a rotating assembly having a non-vertical axis of rotation. When the center of mass of the rotating assembly is not concentric with the axis of rotation, the condition of unbalance exists. When the rotating assembly is driven by a motor or drives a generator, fluctuations in power are produced proportional to the degree of unbalance. The method and apparatus to determine the degree of mass imbalance consists of measuring the average instantaneous real power over an interval of time, calculating the Fourier Transform of the demodulated signal, establishing the peak amplitude and phase associated with the angular velocity of the rotating assembly and calculating the amount of unbalance. The method and apparatus to provide for a corrective solution consists of simultaneously acquiring a position reference signal of the rotating assembly with the average instantaneous real power signal, calculating the phase difference between the two acquired signals at the angular velocity of the rotating assembly, calculating the magnitude of the unbalance, and calculating the quantity and location of corrective weight necessary to minimize the unbalance to an acceptable level.

19 Claims, 7 Drawing Sheets

METHOD AND APPARATUS FOR IN SITU UNBALANCE AND CORRECTIVE BALANCE DETERMINATION FOR A NON-VERTICAL AXIS ROTATING ASSEMBLY

CROSS REFERENCE TO RELATED APPLICATIONS

Not applicable.

STATEMENT REGARDING FEDERALLY SPONSORED RESEARCH AND DEVELOPMENT

Not applicable

BACKGROUND OF INVENTION

1. Field of Invention

This invention relates to the determination of the degree of unbalance and the balancing of a rotating assembly such that the vibratory effect of having the center of rotating mass eccentric to the axis of rotation is minimized.

2. Related Art

It is necessary that the center of mass of rotating assembles are concentric with the axis of rotation for optimal performance of their respective functions. Any deviation from this concentricity will represent additional forces which must be borne by a given structure that supports the rotating assembly. These additional forces manifest themselves as vibration and can not only interfere or diminish the ability of the rotating object to perform its function but can also accelerate the fatigue life of all the interconnected components themselves e.g. bearings, gears, shafts, structural supports connected to the rotating assembly. In wind turbines, the increase in the degree of unbalance not only decreases the mechanical life of connected components but will also increase the necessary wind velocity required for the generation of power.

It is well known in the art to balance a rotating mass as a complete assembly. The art is generally limited to rotating masses which are sufficiently small in diameter, have sufficient speed, and can be measured without external forces such as those which are environmentally induced. Additionally, prior art relies on a vibratory response of the unbalance which could be either diminished or amplified by the supporting structure of the rotating assembly. Furthermore, in order for a corrective balance solution to be determined, prior art requires that a vibratory response is first known and then knowing the vibratory response of a known mass placed at a known location before a corrective balance solution is determined. The balancing solution becomes prescriptive only after the series of trial runs are performed. These vibratory responses are measured with displacement, velocity, or acceleration transducers, each with their respective limitations relative to machine configuration and machine angular velocity. Vibratory response will be exponentially proportional to product of the mass unbalance and the square of angular velocity. Low speed applications require specialized equipment to assess vibratory response, especially below 60 RPM where specialize instrumentation is required due to the decreased signal-to-noise ratio.

U.S. Pat. No. 5,140,856 to Larson (1992) teaches one method of a balancing a complete assembly whose parameters fall outside of the well known art which requires the use of fixtures, specialized equipment and associated skill set, and personnel to perform the process at great heights and in proximity to rotating equipment. The method is time consuming and also extremely subject to environmental influences such as wind which will thereby affect the accuracy of the results. This method relies on not only upon the vibratory response of the unbalance upon the structure but requires the installation of a known mass at a known location to determine the location and magnitude of the unbalanced force prior to the determination of a corrective balance solution.

It is desirable to have a novel method and apparatus to determine the degree of unbalance on a rotating assembly which has a non-vertical axis of rotation that provides a simple, practical, prescriptive, and economical means to assess the severity of the condition and is independent of the structure's vibratory response to the unbalance. Additionally, any improvement in reducing the risk to personnel, minimizing the level of skill, reducing the time required for correction, as well as being able to provide a means to quickly assess the severity of a population of assets in this class is highly desirable. It is also desirable to have a method to provide for a corrective balance solution which is not influenced by the supporting structure and is prescriptive without the need for a trial and discovery process.

BRIEF SUMMARY OF INVENTION

The present invention broadly comprises a method and apparatus for sensing, measuring, and providing a balance correction solution for the amount of residual mass unbalance which may exist in the operation of a rotating assembly whose axis of rotation is non-vertical. The method comprises the steps of: (a) measuring the average instantaneous real power over an interval of time, (b) measuring a position reference of the rotating assembly coincidentally with the average instantaneous real power, (b) accumulating the average instantaneous real power and position reference, (d) performing a mathematical calculation to extract the peak amplitude and phase of average instantaneous power and the angular velocity and phase of position reference of the rotating assembly, (e) dividing peak amplitude by the angular velocity and scaling factor to obtain unbalance mass torque, (f) subtracting the phase of the average instantaneous power and phase of position reference to obtain an angular displacement from the position reference, (g) determining a mass unbalance torque vector equal in magnitude to unbalance mass torque with the phase of average instantaneous power, (h) determining corrective balance torque vectors wherein the vector sum of the corrective balance torque vectors and unbalance mass torque vector are nullified and wherein corrective balance torque vectors substantially coincide with a physical structure on the rotating assembly for mounting corrective weight, (i) dividing the magnitude of the corrective balance torque vectors by a radial distance from the axis of rotation of the rotating assembly to determine the amount of corrective weight at the radial distance, and (j) installing corrective weight at the radial distance on the physical structure for each of the corrective balance torque vectors. The invention also includes an apparatus for implementing the method of the invention.

One object of the invention is to provide a method and apparatus to determine the degree of unbalance on a rotating assembly whose axis of rotation is non-vertical and connected to a motor or generator, such as a wind turbine, which is independent of vibratory response of the rotating assembly and is not subject to an inherently low signal-to-noise ratio and where external influences are minimized.

Another object of the invention is to provide a method and apparatus to quantify the condition of unbalance on a population of assets in this class without the need for specialized equipment and personnel and that requires only a fraction of the time as compared to those methods taught in prior art.

It is yet another object of the invention to provide a method and apparatus to determine the a prescriptive corrective balance solution which is independent of the vibratory response which eliminates the trial and error method of discovering a corrective solution and can be applied to both variable speed as well as constant speed rotating assemblies.

This and other objects, features, and advantages of the invention will become readily apparent to one having ordinary skill in the art upon study of the following detailed description in view of the drawings and appended claims.

REFERENCE NUMERALS IN DRAWINGS

- 10—Unbalanced mass
- 20—Disk
- 22—Axial angle of displacement
- 23—Rotational angle of displacement
- 24—Axis of rotation
- 25—Position detector
- 30—Position reference
- 35—Per unit equilibrium torque
- 40—Position reference signal
- 45—Rotating assembly
- 47—Gearbox
- 50—Generator
- 52—Current transformer
- 54—Voltage potential transformer
- 56—Unbalance detection and correction apparatus
- 58a—Corrective balance torque vector
- 58b—Corrective balance torque vector
- 58c—Corrective balance torque vector
- 60—Mass unbalance torque vector
- 62a—Blade A
- 62b—Blade B
- 62c—Blade C
- 64—Instantaneous real power calculation
- 66—Averaging Calculation
- 68—Buffer
- 70—FFT calculation
- 72—Mass unbalance vector calculation
- 74—Corrective vector calculation
- 76—Corrective weight calculation
- 78—User interface and display
- 80—Storage Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and the equivalents thereof. The use of "consisting of" and variations thereof herein is meant to encompass only the items listed thereafter and equivalents thereof.

DETAILED DESCRIPTION OF THE INVENTION

Figure 1:
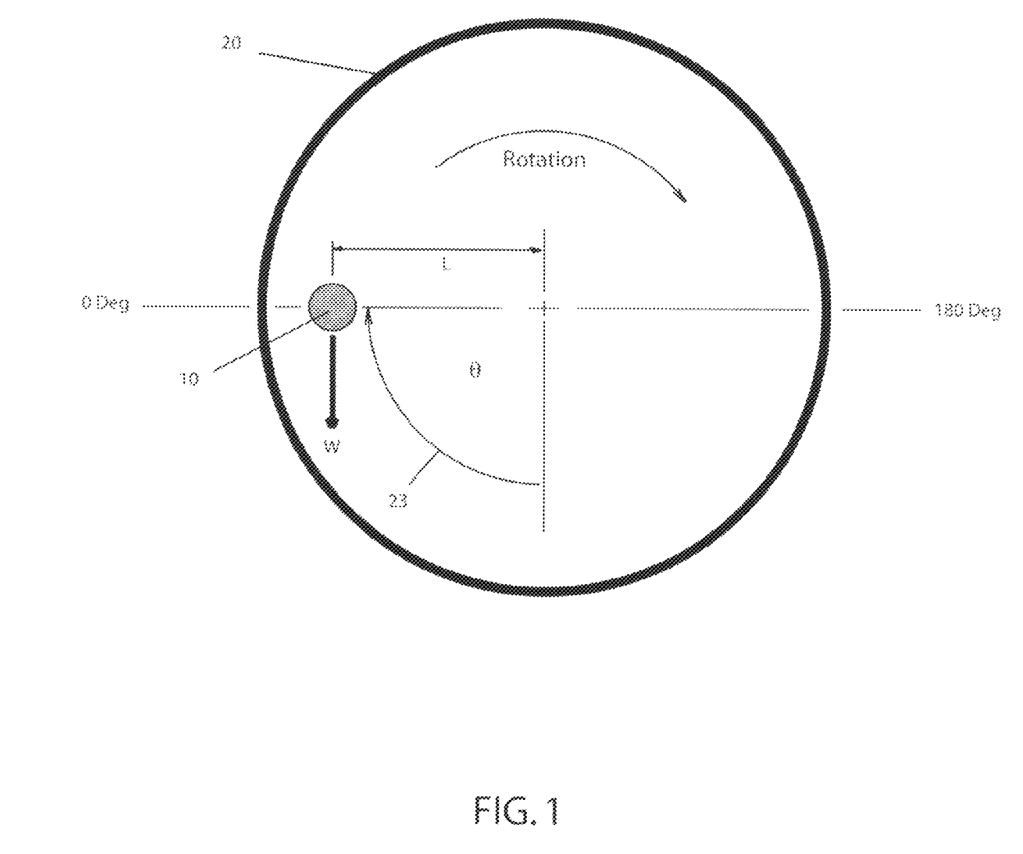
FIG. 1 illustrates the free body force diagram of an unbalanced disk with its eccentric center of mass angularly displaced to a horizontal position.
Figure 1A:
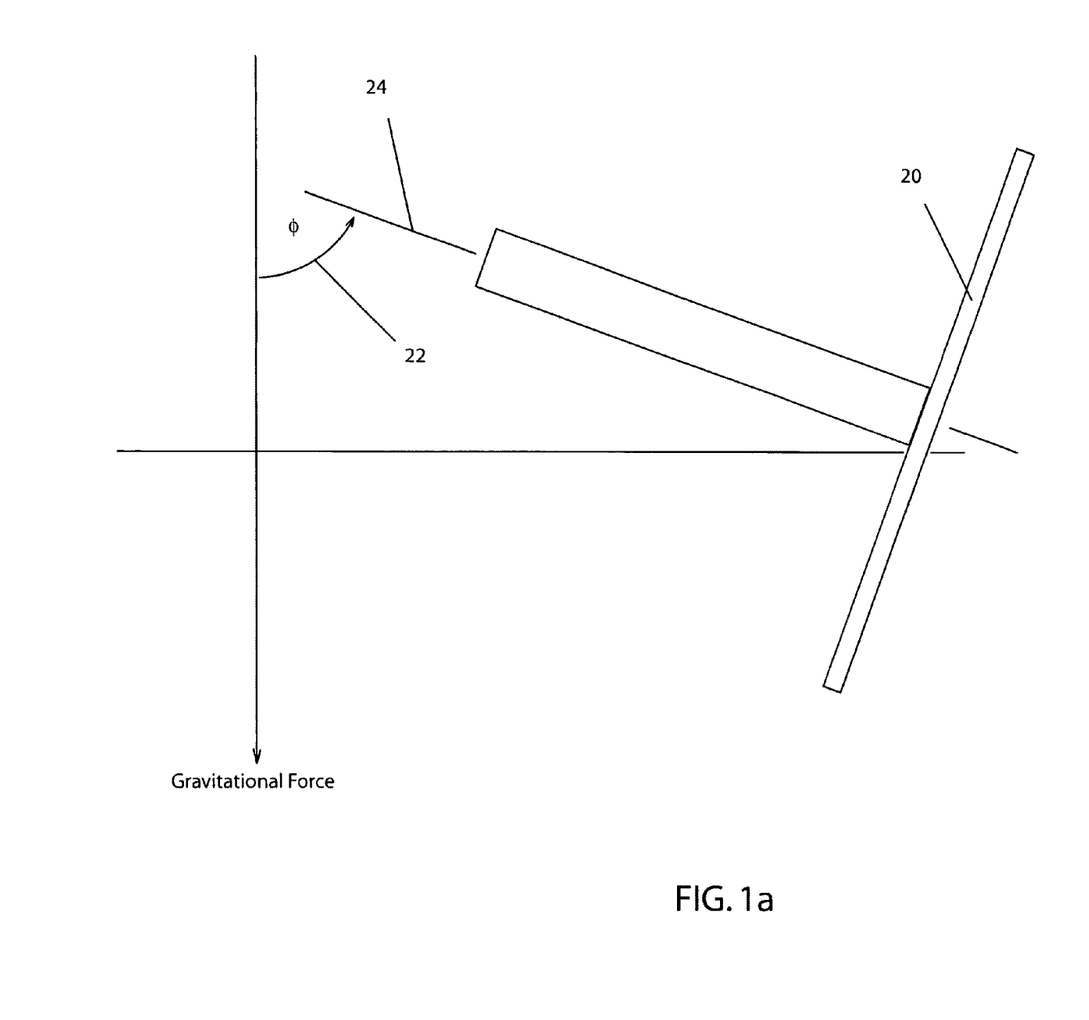
FIG. 1a illustrates a disk with an axis angular displacement from the force of gravity.

FIG. 1, 1a Preferred Embodiment

In order to appreciate the method disclosed, one must first understand basis upon which the objects of the invention can be realized. FIG. 1 is a free body force diagram which illustrates the static forces due to the center of mass not concentric to the axis of rotation. The center of mass may be represented by a mass 10 displaced at distance L from the axis of rotation on a disk 20 with an axis of rotation 24 having an axial angle of displacement 22 of 90 degrees relative to the force of gravity. The torque applied to axis of rotation 24 necessary to maintain equilibrium at any axial angle of displacement 22 and any rotational angle of displacement 23 is expressed by:

$$T = W*L*\cos(\theta)*\sin(\Phi),$$

where
  $\Phi$ = axial angle of displacement 22 from gravitational force,
  $\theta$ = rotational angle of displacement 23 from a reference where a zero value of $\theta$ and the $\cos(\theta)$ is positively maximum,
  L = distance of the Mass from the axis of rotation,
  * = multiplication,
  W = Force due to gravity exerted on mass 10 = m*g,
    where
      m = mass,
      g = gravitational constant The power necessary to provide a torque at a given angular velocity is defined by:

$$\text{Power} = T*\omega,$$

where
  T = Torque,
  $\omega$ = Angular velocity
  * = multiplication

It follows that the power required to rotate the unbalance mass 10 at a constant angular velocity is expressed by:

$$\text{Power} = W*L*\cos(\theta)*\sin(\Phi)*\omega$$

This power due to mass 10 will be superimposed on any other work required by the system. Conversely, if the rotating assembly is connected to a generator, this power will superimposed upon the power output of the generator.

Figure 2:
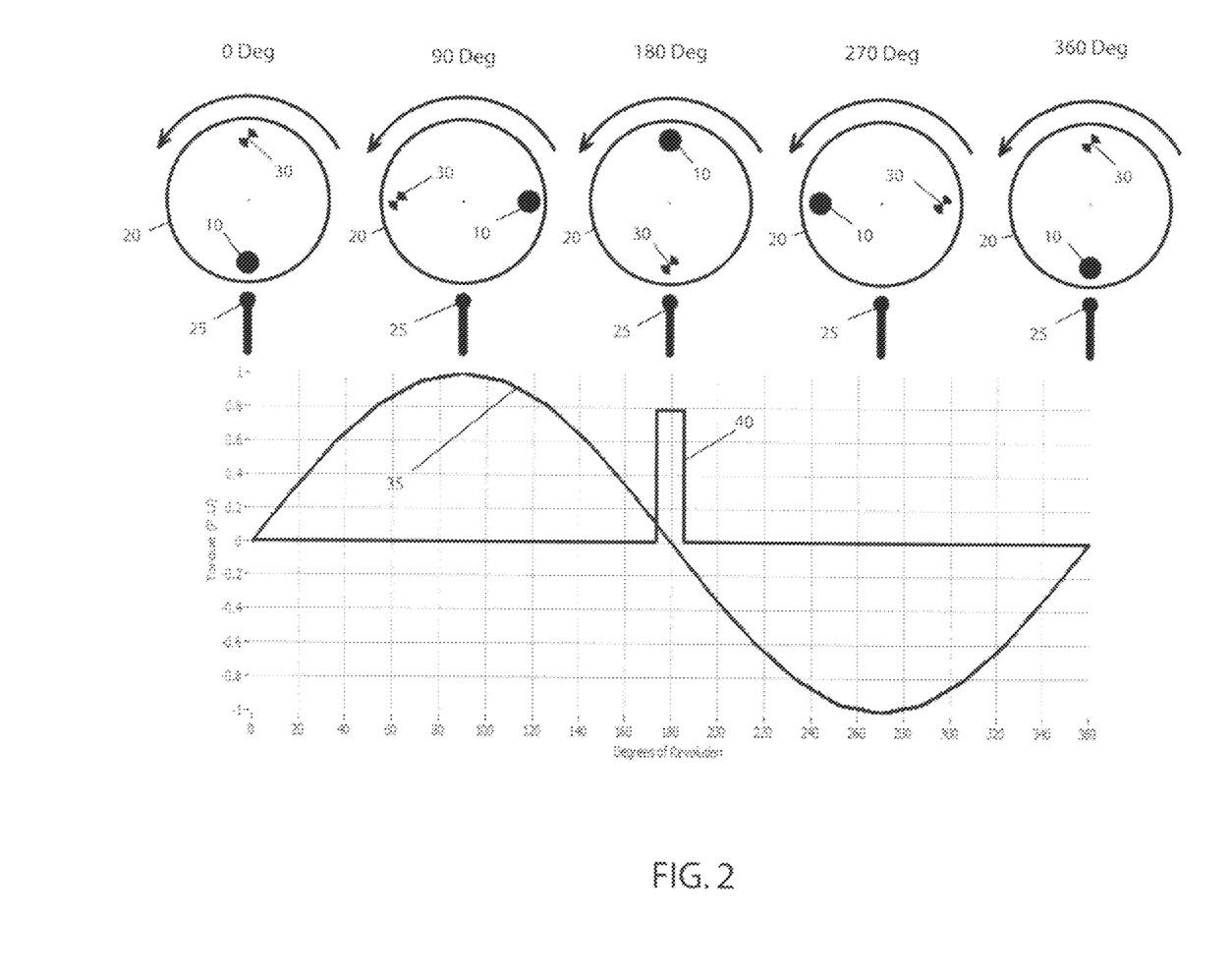
FIG. 2 illustrates a complete revolution of an unbalanced disk with a corresponding plot of torque and position reference signals.

FIG. 2 Preferred Embodiment

FIG. 2 illustrates disk 20 with mass 10 through a complete revolution, a position reference 30, opposite mass 10, and a position detector 25. Axial angle of displacement 22 has a value of 90 degrees, not shown. As mass 10 is rotated through the revolution, the torque required to maintain equilibrium at rest is a function of the cosine of angle of displacement 23. At a reference angle of 0 degrees, the value of angle of displacement 23 is 270 degrees and no torque is required to maintain mass 10 in equilibrium as the cosine of 270 degrees is zero. As mass 10 rotated to 90 degrees reference, angle of displacement 23 is 360 or 0 degrees and requires a positive maximum amount of torque to maintain mass 10 in equilibrium. As mass 10 rotated to 180 degrees reference, angle of displacement 23 is 90 degrees and requires no torque to maintain mass 10 in equilibrium. At 180 degrees reference, position detector 25 senses position reference 30 as shown on the plot illustrating the per unit equilibrium torque 35 and the position reference signal 40 from position detector 25. As mass 10 is rotated to 270 degrees reference, angle of displacement 23 is 180 degrees and requires a negative maximum amount of torque to maintain mass 10 in equilibrium. As mass 10 rotated to 360 or 0 degrees reference the value of angle of displacement 23 is 270 degrees and no torque is required to maintain mass 10 in equilibrium. Since the peak positive torque is required at 90 degrees reference and the position reference 30 is detected at 180 degrees reference, the torque required to rotate mass 10 is said to lead the position reference by 90 degrees. Obviously, the torque requirement presented is scaled by the sin($\Phi$). In this instant case, $\Phi$ or axial angle of displacement 22, has been set to 90 degrees and thus has a scaling factor of one.

Figure 3:
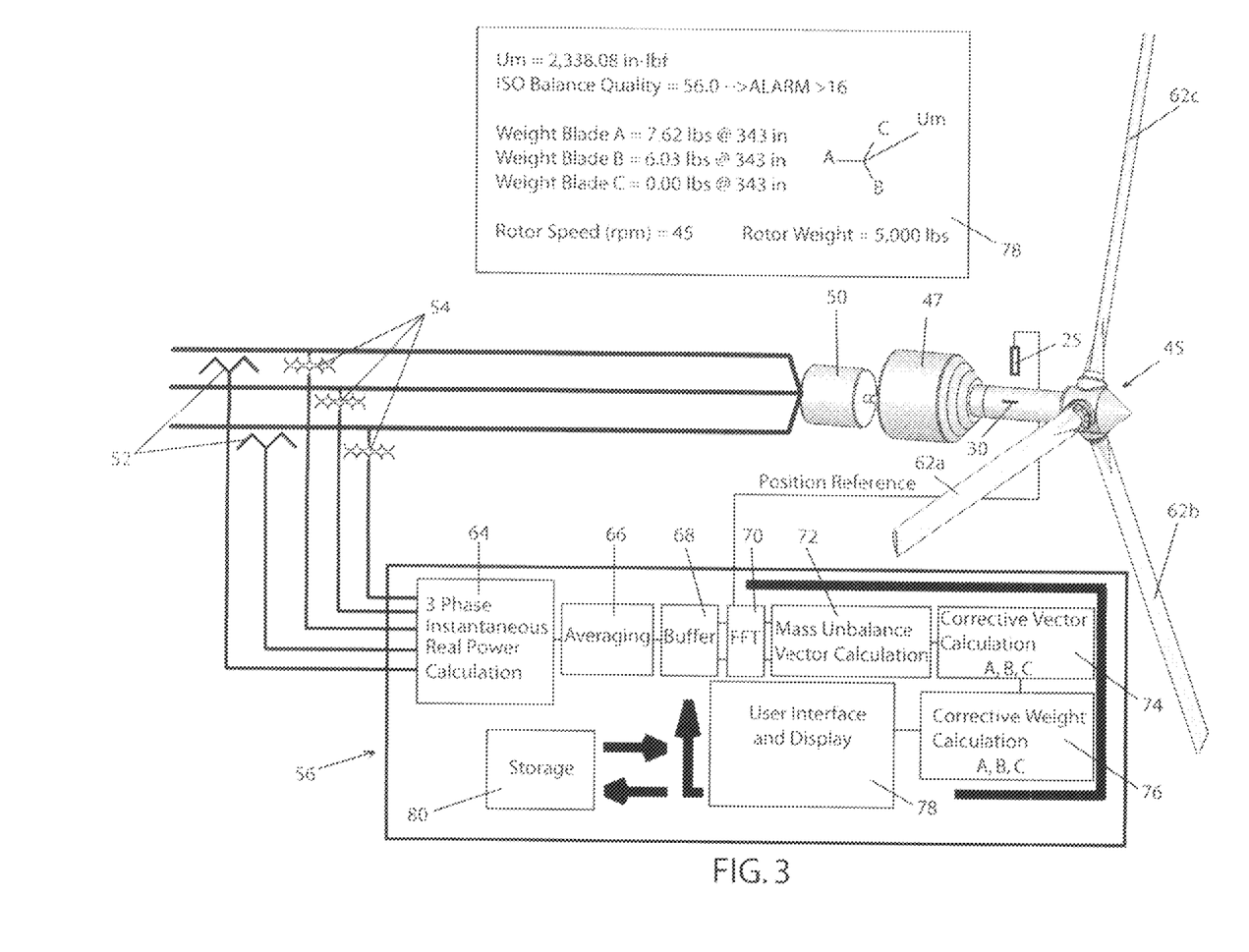
FIG. 3 illustrates a rotating assembly system having an axis of rotation a horizontal plane, a gearbox, a generator, and a preferred embodiment of present invention.

FIG. 3 Preferred Embodiment

FIG. 3 illustrates a rotating assembly 45 associated with a wind turbine generating system and a preferred embodiment of the present invention. Rotating assembly 45 is in communication with a gearbox 47 which in turn is in communication with a generator 50. Generator 50 is electrically connected to power distribution system, not shown, to which power is delivered. For purposes of this description, axial angle of displacement 22, is assume to be 90 degrees. It should be appreciated that the operating principles described in FIG. 2 would apply whether the system was operating in a generating mode or a motoring mode. The operating currents and voltages are scaled through transformation as shown by a current transformer 52 and a voltage potential transformer 54 in order to be utilized by most measuring systems well known in the art of process measurement.

In this preferred embodiment, three phase alternating current and voltages are measured by the present invention, an unbalance detection and correction apparatus 56. Apparatus 56 is a data acquisition system, processor, and display and storage for realizing the methods set forth for the in situ determination of unbalance and a corrective balance solution which may exist on rotating assembly 45. The hardware utilized in apparatus 56 is common in the art of data acquisition and processing. Preferred embodiments of the well known prior art in data acquisition are noted with respect to the present and preferred embodiment of present invention.

The novelty of apparatus 56 exists in the processing of the acquired data according to the methods described in the present invention. Apparatus 56 digitizes and multiplies the in phase portion of instantaneous voltage and current by means of an instantaneous real power calculation 64 to establish instantaneous real power. Digitization of voltage and current must occur simultaneously to minimize error due to phase shift which would result from an alternate method of digitization. It is also preferred that the analog to digital conversion be performed by a Sigma Delta converter to reduce the complexity and associated phase shift of analog anti-aliasing filters. The values of instantaneous real power are averaged over an interval of time by means of an averaging calculation 66. In order to identify the real power associated with the torque of an unbalanced rotating assembly 45, the interval over which the instantaneous real power is averaged needs to be a fraction of the time for a revolution. The Nyquist-Shannon sampling theorem requires that the number of samples, or average instantaneous real power calculations in the preferred embodiment, be at least twice the frequency of interest to adequately represent the desired signal or information. This theorem holds only if there are no frequencies present higher than the frequency of interest. However, signals in the real world have a high probability of containing higher frequency content than the signal of interest. Analog filters are used to attenuate these undesirable frequencies such that Nyquist-Shannon sampling theorem is satisfied. Practically, it is preferable to sample more than twice the frequency of interest to compensate for practical realizations of an analog filter and subsequently lowers the probability of reconstructing information that was not actually present in the original analog signal. In this preferred embodiment, the averaging interval for the instantaneous power is chosen to be at least ten times the angular velocity of rotating assembly 45. Averaging calculation 66 may be numerical whereby the sum of the measurements in the interval are divided by the number of measurements in the interval. Averaging calculation 66 may also be accomplished through the use of a low pass filter as is common in the art of signal processing wherein the cutoff frequency is at least twice the angular velocity of rotating assembly 45, but preferably ten times, and the output of the filter may be subsequently decimated to a sampling rate of not less than two times the cutoff frequency of the low pass filter, preferably not less than 10 times. A DC value is determined and subtracted from the final averaging calculation, leaving only the signal content which varies with time.

Instantaneous real power transducers are common in the art of power measurement and whose output could be used to bypass instantaneous real power calculation 64 and averaging calculation 66 as a direct input to apparatus 56. However, for wide applicability and least intrusive means, the preferred embodiment of apparatus 56 performs its own instantaneous real power calculation 64 and averaging calculation 66. The preferred embodiment has its own external transformation of voltage and current whereby split core current transformers clamp around a current carrying conductor providing the power path to the motor or generator and voltage is taken at a local connection point as is common in the art of power measurement. This particular preferred embodiment assures known calibration accuracy. These measurements can be taken at a location other than the physical equipment location. In the application of a wind turbine, these measurements can be made at the base of the tower rather than at the top of the tower. This preferred embodiment provides the means to assess the condition of unbalance on a population of equipment with a minimal amount of time.

At the moment a value of average instantaneous real power is obtained it is put in a buffer 68 with a coincident position reference value associated with the angular displacement of rotating assembly 45 from position reference 30 and detected by position detector 25. Coincident sampling of position reference value and average instantaneous real power allows mathematical calculations to be performed in either the time domain or the angular domain of the rotating assembly 45. Angular domain calculations are necessary to remove changes in angular velocity if the application is one of variable speed. Position reference 30 is preferably located coincidentally with a known structure and arbitrarily becomes a blade 62a. A buffer 68 accumulates values of average instantaneous real power and position reference preferably for ten revolutions of rotating assembly 45. Once ten revolutions have completed, buffer 68 passes its contents into a FFT calculation 70. The output of FFT calculation 70 produces three outputs: the angular velocity of rotating assembly 45, the peak magnitude of power at the angular velocity of rotating assembly 45, and the angular displacement of the peak magnitude of power at the angular velocity of rotating assembly 45 from position reference 30. The outputs of FFT calculation 70 are used by a mass unbalance calculation 72 where the peak magnitude of power is divided by the angular velocity of rotating assembly 45 and the sine of axial angle of displacement 22, not shown, to establish the magnitude and phase relationship, to position reference 30, of a mass unbalance torque vector 60, FIG. 6. The output of mass unbalance calculation 72 is used by corrective vector calculation 74 to determine the magnitude of corrective balance torque vectors 58a, 58b, 58c-FIG. 6, acting in the direction of blade A 62a, a blade B 62b, a blade C 62c respectively. The output of corrective vector calculation 74 is used by a corrective weight calculation 76 to determine the corrective weights necessary to produce a corrective balance torque vector 58a, 58b, 58c by dividing corrective balance torque vector 58a, 58b, 58c by user defined radial distances from axis of rotation 24, not shown, of rotating assembly 45 for each of corrective balance torque vector 58a, 58b, 58c. A user interface and display 78 graphically illustrates corrective balance torque vector 58a, 58b, 58c and mass unbalance torque vector 60, quantifies the necessary corrective weight required and respective radial distances of installation from the axis of rotation of rotating assembly 45, quantifies the magnitude of mass unbalance torque vector 60, the rotor angular velocity, a ISO balance quality index, and a severity criteria. The user has option to repeat the process and perform averaging of the extracted information to reduce influences of spurious events, store the extracted information, or compare displayed information with previously acquired and stored information.

Figure 4:
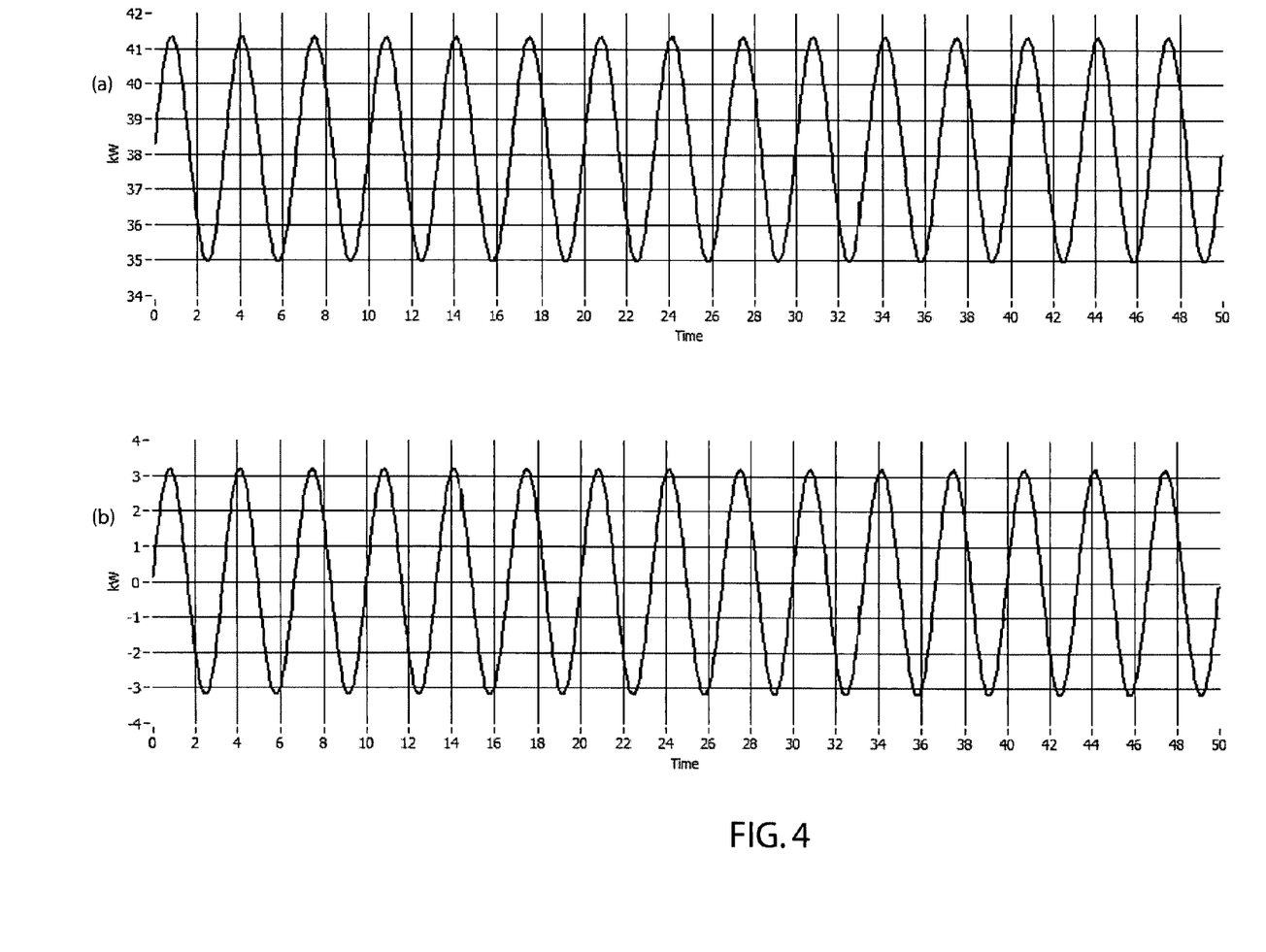
FIG. 4 illustrates a signal of average instantaneous real power for an unbalanced rotating assembly superimposed on nominal power and independently.

FIG. 4 Preferred Embodiment

FIG. 4 illustrates a plot (a) of average instantaneous real power against time for an unbalanced mass rotating at 18 rpm or a revolution period of 3.333 seconds. When the nominal power is subtracted from plot (a), the remaining power is due to the presence of an unbalanced mass shown in plot (b).

Figure 5:
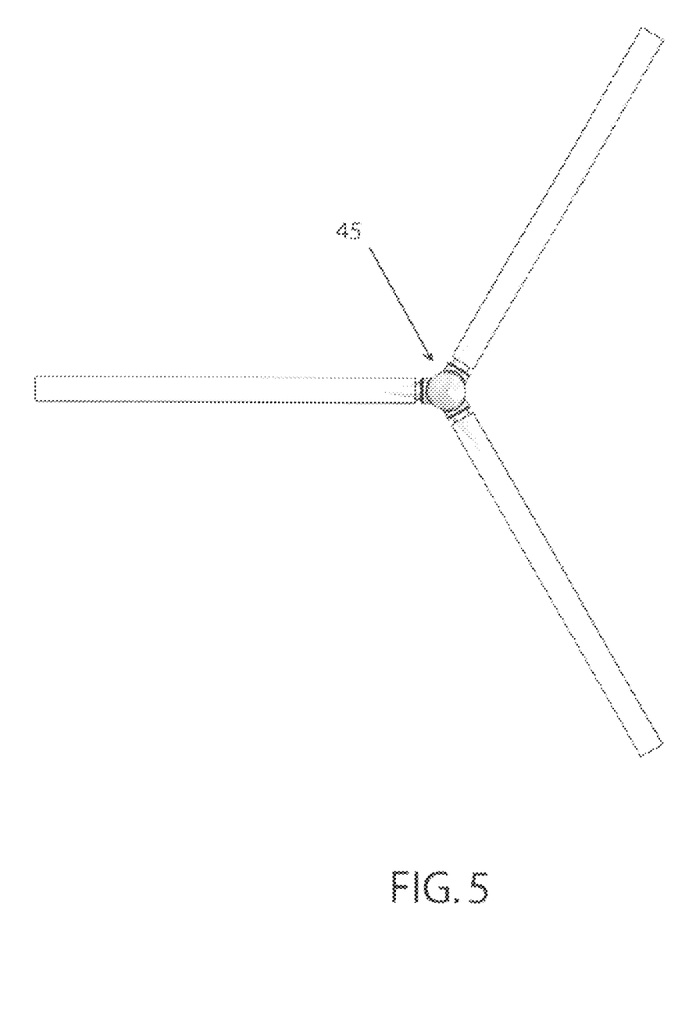
FIG. 5 illustrates a rotating assembly associated with a wind turbine.

FIG. 5 Preferred Embodiment

FIG. 5 illustrates rotating assembly 45 of a wind turbine detached from the system for clarity.

Figure 6:
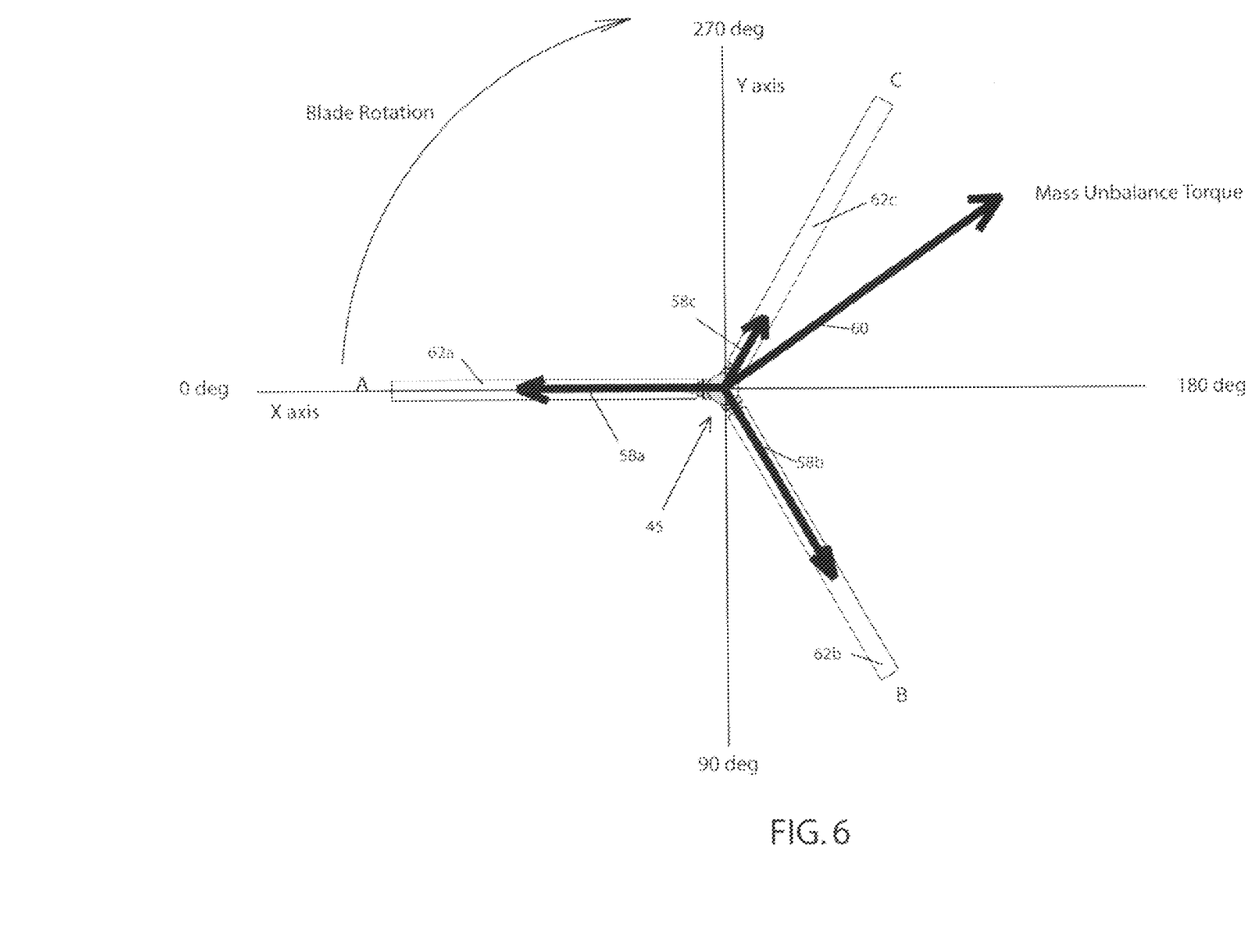
FIG. 6 illustrates a rotating assembly associated with a wind turbine, a mass unbalance torque, corrective torque vectors, and a superimposed polar coordinate system.

FIG. 6 Preferred Embodiment

FIG. 6 illustrates rotating assembly 45, detached for clarity, with mass unbalance torque vector 60, corrective balance torque vector 58a, corrective balance torque vector 58b, corrective balance torque vector 58c, and a polar coordinate system superimposed on rotating assembly 45. A corrective solution for any given mass unbalance torque vector 60 requires that it exert a force which nullifies the unwanted mass unbalance torque vector 60. There is difficulty in any corrective solution where there are not an infinite number of angular locations upon which the corrective solution can exist. In the application of a wind turbine, there is typically only three blades displaced 120 degrees from one another. Therefore a corrective balance torque vector 58a, 58b, 58c could potentially exist on one or more of these structures. For a net force of zero to exist, it follows that the vector sum of mass unbalance torque 60 and corrective balance torque vector 58a, 58b, 58c must equal zero. Each force vector can be resolved into components acting parallel to the x axis and parallel to the y axis. It must follow that the sum of the x component forces and the sum of the y component forces must equal zero.

Component vectors of corrective balance torque vectors 58a, 58b, 58c are derived as follows:

$$Ax = A*\cos(0) = A, \text{ component corrective torque vector of corrective balance torque vector 58a acting parallel to x axis} \quad \text{Eq. (1)}$$

$$Ay = A*\sin(0) = 0, \text{ component corrective torque vector of corrective balance torque vector 58a acting parallel to y axis} \quad \text{Eq. (2)}$$

$$Bx = B*\cos(120), \text{ component corrective torque vector of corrective torque balance vector 58b acting parallel to x axis} \quad \text{Eq. (3)}$$

$$By = B*\sin(120), \text{ component corrective torque vector of corrective torque balance vector 58b acting parallel to y axis} \quad \text{Eq. (4)}$$

$$Cx = C*\cos(240), \text{ component corrective torque vector of corrective balance torque vector 58c acting parallel to x axis} \quad \text{Eq. (5)}$$

$$Cy = C*\sin(240), \text{ component corrective torque vector of corrective balance torque vector 58c acting parallel to y axis} \quad \text{Eq. (6)}$$

$$Umx = Um*\cos(\theta), \text{ component torque vector of mass unbalance torque 60 acting parallel to x axis} \quad \text{Eq. (7)}$$

$$Umy = Um*\sin(\theta), \text{ component torque vector of mass unbalance torque 60 acting parallel to y axis} \quad \text{Eq. (8)}$$

where A, B, and C are magnitudes of corrective balance torque vectors 58a, 58b, 58c acting along the structures blade A 62a, blade B 62b, Blade C 62c respectively and Um is magnitude of mass unbalance torque 60 acting at an angular displacement θ in the direction of rotation from a position reference 30 of rotating assembly 45.

Conditions for net zero force action upon the axis of rotation of rotating assembly 45:

$$Ax + Bx + Cx + Umx = 0 \quad \text{Eq. (9)}$$

Substitution from Eq. (1)

$$A + Bx + Cx + Umx = 0 \quad \text{Eq. (10)}$$

$$Ay + By + Cy + Umy = 0 \quad \text{Eq. (11)}$$

Substitution from Eq. (2)

$$By + Cy + Umy = 0 \quad \text{Eq. (12)}$$

Substitution in Eq. (10) and (12) with Eq. (3) through (8) yields the following two equations:

$$A + B*\cos(120) + C*\cos(240) + Um*\cos(\theta) = 0 \quad \text{Eq. (13)}$$

$$B*\sin(120) + C*\sin(240) + Um*\sin(\theta) = 0 \quad \text{Eq. (14)}$$

Equations (13) and (14) cannot be solved simultaneously as there are two equations and three unknown variables A, B, and C. Therefore, one variable must be chosen and iteratively increased until both equations are sufficiently near zero or zero. In the reference frame established, only two corrective balance vectors are candidates for iteration, corrective balance vectors 58b and 58c, as both have component vectors parallel to the x and y axis. The iteration choice of variable B or C depends upon the angular displacement of the mass unbalance torque vector from position reference 30, not shown, which is made to coincide with Blade A 62a at 0 degrees.

Once iteration process has converged, the magnitudes of corrective balance torque vector 58a, 58b, 58c can then be divided by a radial distance to establish the necessary weight to install respectively on blade A 62a, blade B 62b, blade C 62c which will produce corrective balance torque vector 58a, 58b, 58c. The radial distance should be maximized as far as practical such that a minimum overall weight is added to the rotating assembly 45 for the corrective balance solution. It should be appreciated that these principles can apply to other rotating assemblies where there is not an infinite angular location corresponding to a physical structure of the rotating assembly.

I claim:

1. A method of determining an amount of a mass unbalance torque and a corrective balance solution on a rotational assembly in communication with a means to transform rotational energy, wherein an axis of rotation is displaced by an axis angle of displacement from a gravitational force and the sine of said axis angle of displacement is non-zero, the method comprising the steps of:
   (a) measuring an average instantaneous real power of said means to transform rotational energy over an interval of time,
   (b) measuring a position reference of said rotational assembly coincidentally with said average instantaneous real power over said interval of time,
   (c) accumulating said measurements of said average instantaneous real power and said position reference for at least one of revolution of said rotational assembly,
   (d) performing a mathematical calculation upon said accumulation of said measurements of said average instantaneous power and said position reference to determine an angular velocity, an angular velocity phase and a peak amplitude of said average instantaneous real power and a phase of said average instantaneous real power at said angular velocity of said rotational assembly,
   (e) dividing said peak amplitude by said angular velocity and a scaling factor to obtain said mass unbalance torque related to rotation of an unbalanced mass,
   (f) subtracting said phase of said average instantaneous real power and said phase of said angular velocity to obtain an angular displacement from said position reference at said angular velocity,
   (g) calculating a mass unbalance torque vector equal in magnitude to said mass unbalance torque and having substantially said phase of said average instantaneous real power,
   (h) determining corrective balance torque vectors wherein the vector sum of said corrective balance torque vectors and said mass unbalance torque vector is substantially nullified and wherein said corrective balance torque vectors substantially coincide with a physical structure on said rotational assembly upon which a corrective weight necessary to produce each of said corrective balance torque vectors is mounted,
   (i) dividing the magnitude of said corrective balance torque vectors by a radial distance from said axis of rotation of said rotational assembly to determine the amount of said corrective weight at said radial distance for each of said corrective balance torque vectors, and
   (j) installing said corrective weight at said radial distance on said physical structure for each of said corrective balance torque vectors.

2. The method of claim 1, wherein said scaling factor is the sine of said axis angle of displacement.

3. The method of claim 1, wherein said interval of time is the time for a fraction of one revolution of said rotational assembly.

4. The method of claim 3, wherein the fraction is one-tenth.

5. The method of claim 1, wherein said corrective balance torque vectors are determined by iteratively increasing the magnitude of at least one of said corrective balance torque vectors until the sum of all component vectors, acting in perpendicularity with each other, of a plurality of said corrective balance torque vectors and said mass unbalance torque vector converges to a value which is substantially zero.

6. The method of claim 1, wherein said average instantaneous real power is a discrete value representing an average of discrete samples of instantaneous real power contained in said interval.

7. The method of claim 6, wherein said average instantaneous real power is the output of a low pass filter acting upon said instantaneous real power wherein said low pass filter has a cut off frequency no less than twice the angular velocity of said rotational assembly.

8. The method of claim 1, wherein said interval of time is referenced to an angular position of said rotational assembly, wherein subsequent calculations are based upon constant changes in said angular position of said rotational assembly whereby changes in said angular velocity do not affect subsequent mathematical calculations.

9. The method of claim 1, wherein said mathematical calculation comprises a Fourier Transform.

10. The method of claim 1, wherein a substantially proportional component of said average instantaneous real power is measured and scaled to substantially represent said average instantaneous power.

11. The method of claim 10, wherein said substantially proportional component is at least one phase current from a motor or a generator in communication with said rotational assembly.

12. The method of claim 11, wherein said phase current is an absolute value.

13. The method of claim 10, wherein said substantially proportional component is torque.

14. An apparatus for determining an amount of a mass unbalance torque and a corrective balance solution on a rotational assembly in communication with a means to transform rotational energy, wherein an axis of rotation is displaced by an axis angle of displacement from a gravitational force and the sine of said axis angle of displacement is non-zero, and wherein the means to transform rotational energy comprises a motor or a generator, the apparatus comprising:
   (a) means for measuring an average instantaneous real power of said motor or said generator over an interval of time,
   (b) means for measuring a position reference of said rotational assembly coincidentally with said average instantaneous real power over said interval of time,
   (c) means for accumulating said measurements of said average instantaneous real power and said position reference for at least one revolution of said rotational assembly,
   (d) means for performing a mathematical calculation upon said accumulation of said measurements of said average instantaneous real power and said position reference to determine an angular velocity, an angular velocity phase and a peak amplitude of said average instantaneous real power and a phase of said average instantaneous real power at said angular velocity of said rotational assembly, (e) means for dividing said peak amplitude by said angular velocity and a scaling factor of said rotational assembly to obtain mass unbalance torque related to rotation of an unbalanced mass, (f) means for subtracting said phase of said average instantaneous real power and said phase of said position reference to obtain a phase difference at said angular velocity, (g) means for calculating a mass unbalance torque vector equal in magnitude to said mass unbalance torque and having substantially said phase of said average instantaneous real power, (h) means for calculating corrective balance torque vectors wherein the vector sum of said corrective balance torque vectors and said mass unbalance torque vector is substantially nullified, and wherein said corrective balance torque vectors substantially coincide with a physical structure on said rotational assembly upon which a corrective weight necessary to produce each of said corrective balance torque vectors is mounted, (i) means for dividing the magnitude of said corrective balance torque vectors by a radial distance from said axis of rotation of said rotational assembly to determine the amount of said corrective weight at said radial distance for each of said corrective balance torque vectors, (j) means for displaying said corrective balance torque vectors, said mass unbalance torque vector, said corrective weight, said angular velocity, a balance quality, and a balance severity criteria, (k) means for storage of said corrective balance torque vectors, said mass unbalance torque vector, said corrective weight, said angular velocity, said balance quality, and said balance severity criteria, (l) means for comparison of said corrective balance torque vectors, said mass unbalance torque vector, said corrective weight, said angular velocity, said balance quality, and said balance severity criteria to stored values of said corrective balance torque vectors, said mass unbalance torque vector, said corrective weight, said angular velocity, said balance quality, and said balance severity criteria.

15. The apparatus of claim 14 wherein said means for calculating said corrective balance torque vectors is accomplished by iteratively increasing the magnitude of at least one of said corrective balance torque vectors until the sum of all component vectors, acting in perpendicularity, of a plurality of said corrective balance torque vectors and said unbalance mass torque vector converges to a value which is substantially zero.

16. An apparatus of claim 14, wherein said interval of time is the time for a fraction of one revolution of said rotational assembly.

17. An apparatus of claim 16, wherein said fraction is one-tenth.

18. An apparatus of claim 14, wherein said scaling factor is the sine of said axis angle of displacement.

19. An apparatus of claim 14, wherein a total time associated with a sum of a plurality of said intervals of time is not less than a time for ten revolutions of said rotational assembly.

* * * * *